(12) United States Patent
Favero et al.

(10) Patent No.: US 12,098,325 B2
(45) Date of Patent: Sep. 24, 2024

(54) METHOD FOR MODIFYING THE WATER PERMEABILITY OF A SUBTERRANEAN FORMATION

(71) Applicant: SNF GROUP, Andrezieux Boutheon (FR)

(72) Inventors: Cédrick Favero, Andrezieux Boutheon (FR); Olivier Braun, Andrezieux Boutheon (FR); Lionel Lauber, Andrezieux Boutheon (FR)

(73) Assignee: SNF GROUP, Andrezieux Boutheon (FR)

( * ) Notice: Subject to any disclaimer, the term of this patent is extended or adjusted under 35 U.S.C. 154(b) by 419 days.

(21) Appl. No.: 17/422,838

(22) PCT Filed: Jan. 29, 2020

(86) PCT No.: PCT/FR2020/050135
§ 371 (c)(1),
(2) Date: Jul. 14, 2021

(87) PCT Pub. No.: WO2020/157430
PCT Pub. Date: Aug. 6, 2020

(65) Prior Publication Data
US 2022/0145166 A1 May 12, 2022

(30) Foreign Application Priority Data
Feb. 1, 2019 (FR) ..................... 1901019

(51) Int. Cl.
*C09K 8/588* (2006.01)
*C08F 220/56* (2006.01)
(52) U.S. Cl.
CPC ............ *C09K 8/588* (2013.01); *C08F 220/56* (2013.01)

(58) Field of Classification Search
None
See application file for complete search history.

(56) References Cited

U.S. PATENT DOCUMENTS

| 4,683,949 | A | 8/1987 | Sydansk et al. |
| 7,700,702 | B2 | 4/2010 | Gaillard et al. |

(Continued)

FOREIGN PATENT DOCUMENTS

| FR | 2868783 A1 | 10/2005 |
| FR | 3075219 A1 | 6/2019 |

(Continued)

OTHER PUBLICATIONS

International Search Report (and English translation) and Written Opinion of the International Searching Authority for International Application No. PCT/FR2020/050135 mailed on May 4, 2020.
Griffin, W.C., "Classification of Surface-Active Agents by 'HLB'", Journal of the Society of Cosmetic Chemists 1 (1949): 311-326.
An English machine translation of the abstract of the cited reference is enclosed herewith. U.S. Pat. No. 7,700,702 B2 is an English equivalent to the foreign reference, and is also cited herewith.

(Continued)

*Primary Examiner* — Jeffrey D Washville
(74) *Attorney, Agent, or Firm* — Heslin Rothenberg Farley & Mesiti P.C.

(57) ABSTRACT

The present invention relates to a method for modifying the water permeability of a subterranean formation which comprises oil, said method comprising at least the following steps:
Preparing an injection fluid from a dispersion of a hydrophilic phase in a lipophilic phase, with water or brine, the dispersion comprising:
a hydrophilic phase comprising at least one linear (co)polymer E,
a lipophilic phase,
at least one interface polymer composed of at least one monomer of formula (I):

(Continued)

Linear (co)polymer chains        Interface polymer

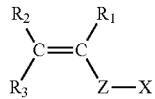

Formula (I)

Injecting the injection fluid into the subterranean formation, comprising a linear (co)polymer E concentration, such that when released and in contact with water, the viscosity of the injection fluid is greater than the viscosity of the oil in the formation.

20 Claims, 2 Drawing Sheets

(56) References Cited

U.S. PATENT DOCUMENTS

2009/0264324 A1* 10/2009 Kurian .................. C09K 8/512
507/224
2020/0362229 A1   11/2020 Braun et al.

FOREIGN PATENT DOCUMENTS

WO          83/00337 A1    2/1983
WO       2011/113470 A1    9/2011

OTHER PUBLICATIONS

An English machine translation of the cited reference is enclosed herewith. U.S. Publication No. US 2020/362229 A1 is an English equivalent to the foreign reference, and is also cited herewith.

* cited by examiner

METHOD FOR MODIFYING THE WATER PERMEABILITY OF A SUBTERRANEAN FORMATION

CROSS REFERENCE TO RELATED APPLICATIONS

This application is a national stage filing under section 371 of International Application No. PCT/FR2020/050135 filed on Jan. 29, 2020, and published on Aug. 6, 2020 as WO 2020/157430, which claims priority to French Application No. 1901019, filed on Feb. 1, 2019. The entire contents of WO 2020/157430 are hereby incorporated herein by reference.

FIELD OF THE INVENTION

This invention is in the field of recovering oil and gas from a subterranean formation. More particularly, the invention relates to a method for modifying the water permeability of a subterranean formation, comprising injecting, into the subterranean formation, an injection fluid comprising at least one (co)polymer encapsulated in a shell.

PRIOR ART

Injecting viscous or gelled polymer solutions into subterranean formations has been a very widespread practice for many years in order to improve hydrocarbon (oil and gas) recovery. These polymer solutions are used in particular to reduce or eliminate the water permeability of a zone or a part of a subterranean formation.

Formations sometimes have zones of interest containing hydrocarbons but with strong permeability contrasts or different water volume fractions. In such cases, and when additional pressure is applied in the subterranean formation with the injection of water in order to produce hydrocarbons, the injected water finds the path offering the least resistance to its propagation, namely the relative permeability most favourable to water, to reach the production wells rapidly; in other words, it passes through zones having a high volume fraction of water and/or having a high permeability, thus flowing past other zones rich in hydrocarbons that are less favourable to its propagation, without pushing them towards the production wells.

Polymer solutions are injected into such high-permeability and/or high water-content zones to replace the existing fluids and reduce their water permeability by virtue of their high viscosity. Once in their gelled form, these polymer solutions are used to divert the flow of water or gas towards the less permeable zones by permanently blocking the high-permeability zones. The blocking of certain zones may indeed prove necessary, since they may result in water inflows which seriously hinder hydrocarbon recovery.

However, during the injection of the polymers into the subterranean formation, the polymer solutions undergo mechanical and chemical degradation. Mechanical degradation is due to high shear stresses and elongational flows, especially in the initial injection unit, nozzles and pumps, constrictions in reservoirs and around wells. Chemical degradation is mainly due to the presence of oxygen, which is the most harmful factor with regard to the degradation of the polymer. The oxidative degradation of polymers is amplified by the presence of reducing chemical species such as iron and hydrogen sulphide. Thus, these different mechanisms lead to a partial degradation of the polymers and an inherent limitation to their effectiveness even before reaching the zone to be treated. These various degradations therefore require an overdose of polymer.

The treatment of subterranean formations often involves the use of cross-linking agents. These are added to the polymer solutions, as described in U.S. Pat. No. 4,683,949. The polymer/cross-linking agent mixture is then injected into the well to be treated with delayed gelation kinetics, the gel only setting after a few hours in the formation around the well. However, these methods are considered unreliable and often use products classified as hazardous to the environment, made from chromium salts or resins. Moreover, gel-based methods do not make it possible to easily control either the gelation kinetics or the consistency of the gel; they generate a high risk of damage to the well, cause the retention and adsorption of the cross-linking agent in the reservoir rock, and only allow the gel to be placed with difficulty in the high-permeability zones while preventing the oil or gas zones from being invaded due to, inter alia, the viscosity which they confer on the injected fluid.

The problem that the applicant proposes to solve is that of protecting, against chemical and mechanical degradation, the polymers used in a method for modifying the water permeability of a subterranean formation without using cross-linking agents.

DISCLOSURE OF THE INVENTION

The invention relates to a method for modifying the water permeability of a subterranean formation using a (co)polymer capable of viscosifying the injection fluid in the presence of water. To this end, the injection fluid comprises at least one linear (co)polymer. In the context of the present invention, the (co)polymer is injected into the subterranean formation in order to modify the permeability of the latter.

The invention relates to a method for modifying the water permeability of a subterranean formation comprising oil, the method comprising at least the following steps:

Preparing an injection fluid from a dispersion of a hydrophilic phase in a lipophilic phase, with water or brine, the dispersion comprising:
  a hydrophilic phase comprising at least one linear (co)polymer E,
  a lipophilic phase,
  at least one interface polymer composed of at least one monomer of formula (I):

[Chem. 1]

Formula (I)

in which,
  R1, R2, R3 are independently selected from the group comprising a hydrogen atom, a methyl group and Z—X,
  Z is selected from the group comprising C(=O)—O; C(=O)—NH; O—C(=O); NH—C(=O)—NH; NH—C(=O)—O; and a saturated or unsaturated, substituted or unsubstituted carbon chain having from 1 to 20 carbon atoms which may have one or more heteroatoms selected from nitrogen and oxygen, X is a group chosen from the alkanolamides, sorbitan esters, ethoxylated sorbitan esters, glyceryl esters, and polyglycosides; and comprising a saturated or unsaturated, linear, branched or cyclic, optionally aromatic, hydrocarbon chain, Injecting the injection fluid into the subterranean formation, the fluid comprising a concentration of linear (co)polymer E such that, when released and in contact with water, the viscosity of the injection fluid is greater than the viscosity of the oil present in the formation.

The expression "polymer composed of at least one monomer" means a polymer obtained from several molecules of at least one monomer. Thus, a polymer of one monomer corresponds to a polymer obtained from several repeating units of molecules of one monomer.

Advantageously, the dispersion and the injection fluid are free of cross-linking agent. Thus, the modification of the subterranean formation results from the increase in the viscosity of the injected fluid during the release of the polymer E. Since the polymer E is linear and does not cross-link during its release into the injected fluid, the modification of the subterranean formation is not due to the fluid gelling.

Before the linear (co)polymer E is released, the viscosity of the injected fluid is advantageously between 1 and 300 cps, and more advantageously between 1 and 250 cps.

After the linear (co)polymer E is released, the viscosity of the injected fluid is advantageously between 1 and 15,000 cps, and more advantageously between 1 and 13,000 cps.

Whatever the initial viscosity of the injected fluid, in the context of the present invention, the viscosity of the injected fluid increases with the release of the linear (co)polymer E. In other words, the injected fluid in which the linear (co)polymer E is released has a higher viscosity than this same injected fluid in which the linear (co)polymer E is still encased by the interface polymer.

Furthermore, in the context of the present invention, the viscosity of the injected fluid in which the linear (co)polymer E is free (released form) is higher than the viscosity of the oil contained in the formation.

The Hydrophilic Phase in Lipophilic Phase Dispersion

The dispersion is a dispersion of a hydrophilic phase in a lipophilic phase. In other words, the lipophilic phase is the continuous phase and the hydrophilic phase is the dispersed phase. The interface polymer is positioned at the interface between the hydrophilic phase and the lipophilic phase. Preferably, the hydrophilic phase is an aqueous phase and the lipophilic phase is an oil phase. Thus, the composition of the invention is advantageously a water-in-oil dispersion, more advantageously a water-in-oil emulsion.

The interface polymer obtained by polymerization of at least one monomer of formula (I) forms a shell at the interface of the hydrophilic phase and the lipophilic phase. In general, the shell is resistant to mechanical stresses such as shearing and more particularly shearing when the polymer is dissolved, when it is injected through valves, chokes and other restrictions at passage speeds greater than 3 meters per second, or when flushing a subterranean formation in the vicinity of the reservoir/borehole interface. The shell is also resistant to chemical stresses which may result from the presence of oxygen, $H_2S$ or metals during the injection phase. Preferentially, the shell is semi-permeable.

Preferably, as indicated above, the dispersion is basically in the form of an inverse emulsion.

In general, the hydrophilic phase is in the form of micrometric droplets dispersed, and advantageously emulsified, in the lipophilic phase. The average size of these droplets is advantageously between 0.01 and 30 µm, and more advantageously between 0.05 and 3 µm. The interface polymer is therefore positioned at the interface between the hydrophilic phase and the lipophilic phase at each droplet. The average size of the droplets is advantageously measured with a laser measuring apparatus using conventional techniques which are part of the general knowledge of a person skilled in the art. A Malvern Mastersizer device may be used for this purpose.

Generally, the dispersion according to the invention contains between 10 and 65% by weight of (co)polymer, and more advantageously between 30 and 60% by weight.

Moreover, the dispersion according to the invention has a hydrophilic phase/lipophilic phase weight ratio advantageously between 0.1 and 100, more advantageously between 1 and 80, and even more advantageously between 10 and 60.

The method for preparing the dispersion is described in the applicant's patent application FR 3 075 219, cited as a reference.

The Linear (Co)Polymer E in the Hydrophilic Phase

The (co)polymer E present in the hydrophilic phase may be a natural (co)polymer, such as, for example, xanthan gums, guar gums, schizophyllan, scleroglucan or other compounds of the polysaccharide family, or a synthetic or semi-synthetic (co)polymer. Preferably, the (co)polymer is a synthetic (co)polymer.

When the (co)polymer is a synthetic (co)polymer, it is preferably a (co)polymer obtained from at least one non-ionic monomer and/or at least one anionic monomer and/or at least one cationic monomer and/or a zwitterionic monomer.

The non-ionic monomer or monomers that may be used in the context of the invention may be chosen, in particular, from the group comprising water-soluble vinyl monomers. The non-ionic monomer does not comprise the monomers of formula (I). Preferred monomers belonging to this class are, for example, acrylamide, methacrylamide, N-isopropylacrylamide, N,N-dimethylacrylamide, and N-methylolacrylamide. Also, N-vinylformamide, N-vinylacetamide, N-vinylpyridine and N-vinylpyrrolidone, acryloyl morpholine (ACMO), glycidyl methacrylate, glyceryl methacrylate and diacetone acrylamide may be used. A preferred non-ionic monomer is acrylamide.

The anionic monomer or monomers are preferably selected from acrylic acid, methacrylic acid, itaconic acid, maleic acid, acrylamido tertiary butyl sulphonic acid (also called ATBS or 2-acrylamido-2-methylpropane sulphonic acid), vinylsulphonic acid, vinylphosphonic acid, said anionic monomer being unsalified, partially or totally salified, and salts of 3-sulphopropyl methacrylate. The salified form advantageously corresponds to the salts of alkali metals (Li, Na, K, etc.), alkaline earth metals (Ca, Mg, etc.) or ammonium, in particular quaternary ammonium.

Hereinbefore and below, cationic monomers and anionic monomers, such as, for example, DMAEMA and ATBS, include unsalified and partially or totally salified forms.

The cationic monomer or monomers that may be used in the context of the invention may be chosen, in particular, from monomers of the acrylamide, acrylic, vinyl, allylic or maleic type having a quaternary ammonium function by salification or quaternization. Mention may be made, in particular and in a non-limiting manner, of quaternized dimethylaminoethyl acrylate (DMAEA), quaternized dimethylaminoethyl methacrylate (DMAEMA), diallyldimethylammonium chloride (DADMAC), acrylamidopropyl trimethylammonium chloride (APTAC), and methacrylamido propyltrimethyl ammonium chloride (MAPTAC).

The cationic monomer or monomers may also be chosen from associative cationic monomers as described in patent FR 2 868 783.

The monomer may optionally be a zwitterionic monomer of the acrylamide, acrylic, vinyl, allylic or maleic type having a quaternary amine or ammonium function and a carboxylic, sulphonic or phosphoric acid function. Mention may be made, in particular and without limitation, of dimethylaminoethyl acrylate derivatives, such as 2-((2-(acryloyloxy)ethyl) dimethylammonio) ethane-1-sulphonate, 3-((2-(acryloyloxy)ethyl) dimethylammonio) propane-1-sulphonate, 4-((2-(acryloyloxy)ethyl) dimethylammonio) butane-1-sulphonate, [2-(acryloyloxy)ethyl] (dimethylammonio) acetate, dimethylaminoethyl methacrylate derivatives such as 2-((2-(methacryloyloxy) ethyl) dimethylammonio) ethane-1-sulphonate, 3-((2-(methacryloyloxy) ethyl) dimethylammonio) propane-1-sulphonate, 4-((2-(methacryloyl oxy) ethyl) dimethylammonio) butane-1-sulphonate, [2-(methacryloyloxy)ethyl] (dimethylammonio) acetate, dimethylamino propylacrylamide derivatives such as 2-((3-acrylamidopropyl) dimethylammonio) ethane-1-sulphonate, 3-((3-acrylamidopropyl) dimethylammonio) propane-1-sulphonate, 4-((3-acrylamidopropyl) dimethylammonio) butane-1-sulphonate, [3-(acryloyloxy) propyl] dimethylammonio) acetate, dimethylamino propyl methylacrylamide derivatives, such as 2-((3-methacrylamidopropyl) dimethylammonio) ethane-1-sulphonate, 3-((3-methacrylamidopropyl) dimethylammonio) propane-1-sulphonate, 4-((3-methacrylamidopropyl) dimethylammonio) butane-1-sulphonate, and [3-(methacryloyloxy)propyl](dimethylammonio) ethylammonio) acetate.

According to one particular embodiment of the invention, the (co)polymer is composed solely of ATBS.

The (co)polymer is preferably an anionic (co)polymer made from acrylamide, preferably an optionally partially post-hydrolyzed (co)polymer of acrylamide and acrylamido tertiary butyl sulphonic acid (ATBS), more preferably a ter(co)polymer of acrylamide, acrylic acid and acrylamido tertiary butyl sulphonic acid (ATBS).

The (co)polymer preferably contains between 10 mol % and 50 mol % of anionic monomer(s), and more preferably between 20 mol % and 45 mol %.

The (co)polymer preferably contains between 50 mol % and 90 mol % of non-ionic monomer(s), and more preferably between 60 mol % and 75 mol %.

Preferably, the (co)polymer contains only anionic and non-ionic monomer units. In other words, it is preferably obtained from at least one anionic monomer and at least one non-ionic monomer.

The (co)polymer may be obtained by any polymerization technique such as conventional radical polymerization, controlled radical polymerization, also referred to as RAFT (reversible-addition fragmentation chain transfer), NMP (nitroxide-mediated polymerization) or ATRP (atom transfer radical polymerization).

According to another particular embodiment of the invention, the (co)polymer of the hydrophilic phase comprises at least one associative cationic monomer and/or at least one LCST group.

In accordance with a particular embodiment, the (co)polymer may comprise at least one LCST group.

According to the general knowledge of a person skilled in the art, an LCST group corresponds to a group whose solubility in water, for a given concentration, is modified above a certain temperature and depending on the salinity. It is a group having a heating transition temperature defining its lack of affinity with the solvent medium. Lack of affinity with the solvent results in opacification or loss of transparency which may be due to precipitation, aggregation, gelation or viscosification of the medium. The minimum transition temperature is referred to as the "LCST" (lower critical solution temperature). For each LCST group concentration, a heating transition temperature is observed. This is higher than the LCST, which is the minimum point of the curve. Below this temperature, the (co)polymer is soluble in water; above this temperature, the (co)polymer loses its solubility in water.

In accordance with a particular embodiment, the (co)polymer may comprise at least one UCST group.

According to the general knowledge of a person skilled in the art, a UCST group corresponds to a group whose solubility in water, for a given concentration, is modified below a certain temperature and depending on the salinity. It is a group having a cooling transition temperature defining its lack of affinity with the solvent medium. Lack of affinity with the solvent results in opacification or loss of transparency which may be due to precipitation, aggregation, gelation or viscosification of the medium. The maximum transition temperature is called "UCST" (upper critical solution temperature). For each UCST group concentration, a cooling transition temperature is observed. This is lower than the UCST, which is the maximum point of the curve. Above this temperature, the (co)polymer is soluble in water; below this temperature, the (co)polymer loses its solubility in water.

In accordance with the invention, the (co)polymer has an advantageously high molecular weight. The expression "high molecular weight" denotes molecular weights of at least 1 million g/mol, preferably between 2 and 40 million g/mol, and more preferably between 5 and 30 million g/mol. The molecular weight is understood as weight average molecular weight.

The Interface Polymer

As already indicated, the interface polymer is obtained from at least one monomer of formula (I):

[Chem. 1]

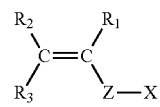

Formula (I)

in which,
R1, R2, R3 are independently selected from the group comprising a hydrogen atom, a methyl group and Z—X, Z is selected from the group comprising C(=O)—O; C(=O)—NH; O—C(=O); NH—C(=O)—NH; NH—C(=O)—O; and a saturated or unsaturated, substituted or unsubstituted carbon chain having from 1 to 20 carbon atoms which may have one or more heteroatoms selected from nitrogen and oxygen, X is a group chosen from the alkanolamides, sorbitan esters, ethoxylated sorbitan esters, glyceryl esters, and polyglycosides; and comprising a saturated or unsaturated, linear, branched or cyclic, optionally aromatic, hydrocarbon chain.

In other words, X comprises a hydrocarbon chain and a group chosen from alkanolamides, sorbitan esters, ethoxylated sorbitan esters, glyceryl esters and polyglycosides. Advantageously, this hydrocarbon chain comprises C2 to C30 carbon atoms. In a preferred embodiment, it is an integral part of the group chosen from alkanolamides, sorbitan esters, ethoxylated sorbitan esters, glyceryl esters and polyglycosides.

X may therefore be one of the following groups:
- an alkanolamide, preferably of the formula diethanolamide monooleate (Witcamide 511), stearoyl ethanolamide (Witcamide 70), oleic acid monoisopropanolamide (Witcamide 61), isostearic acid monoisopropanolamide (Witcamide SPA), coconut monoisopropanolamide (Empilan CIS), coconut monoethanolamide, oleic acid diethanolamide (Mexanyl), or oleyl monoisopropanolamide (Simaline IE 101), a sorbitan ester, for example, but not limited to, sorbitan monolaurate (Span 20), sorbitan monopalmitate (Span 40), sorbitan monostearate (Span 60), sorbitan monoisostearate (Span 70), sorbitan tristearate (Span 65), sorbitan monooleate (Span 80), sorbitan sesquioleate (Span 83) or sorbitan trioleate (Span 85),
- an ethoxylated sorbitan ester, preferably of the formula polyethylene glycol sorbitan monolaurate (Tween 20), polyethylene glycol sorbitan monopalmitate (Tween 40), polyethylene glycol sorbitan monostearate (Tween 60), polyethylene glycol sorbitan monooleate (Tween 80) or polyethylene glycol sorbitan trioleate (Tween 85),
- a glyceryl ester, preferably of the formula polyglycerol monolaurate (Decaglyn 1-L), polyglycerol myristate (Decaglyn 1-M), polyglycerol decaoleate (Polyaldo 10-10-0), polyglycerol distearate (Polyaldo 6-2-S), polyglycerol oleate (Polyaldo 10-1-O), polyglycerol caprate (Polyaldo 10-1 CC KFG), or polyglycerol stearate (Polyaldo 10-1-S),
- a polyglucoside, preferably of the formula decyl glucoside (Triton BG-10), lauryl glucoside (Plantacare 1200UP), capryl glucoside (Plantacare 810 UP), butyl glucoside (Simulsol SL 4), heptyl glucoside (Simulsol SL 7 G), octyl and decyl glucoside (Simulsol SL 8), decyl glucoside (Simulsol SL 10), undecyl glucoside (Simulsol SL 11 W), decyl and hexadecyl glucoside (Simulsol SL 26), or octyl and hexadecyl glucoside (Simulsol SL 826).

According to one particular embodiment, the monomer of formula (I) has an HLB value advantageously lower than 4.5, and advantageously of at least 1.

The HLB value (hydrophilic-lipophilic balance) makes it possible to quantify the balance that exists between the hydrophilic part and the lipophilic part of a molecule. This value is determined by calculating the values of the different parts of the molecule, as described by Griffin in 1949 (Griffin W C, Classification of Surface-Active Agents by HLB, Journal of the Society of Cosmetic Chemists 1 (1949): 311).

In the present invention, the Griffin method, conventionally used, is based on calculating the values of the chemical groups of the molecule. Griffin assigned a value of between 0 and 20, thus giving information on the solubility of the molecule in a hydrophilic medium and in a lipophilic medium. Thus, substances having an HLB of 10 are distributed equally in the two phases, i.e., the hydrophilic part in the hydrophilic phase and the hydrophobic part in the lipophilic phase.

HLB=20 (Mh/M)

M: the molecular weight of the molecule
Mh: the molecular weight of the hydrophilic part.

In a preferred embodiment, the monomer of formula (I) has the following formula:

[Chem. 1]

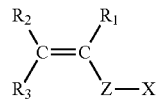

Formula (I)

in which,
- R1, R2, R3, independently, are a hydrogen atom or a methyl group,
- Z is selected from the group comprising $CH_2$, $C(=O)-O$, $C(=O)-NH$, and $-(C=O)-O-CH_2-CH(OH)-CH_2$,
- X is a group chosen from the alkanolamides and the sorbitan esters, and comprising a saturated or unsaturated, linear, branched or cyclic, optionally aromatic, hydrocarbon chain.

In accordance with a preferred embodiment, the monomer of formula (I) is selected from sorbitan monooleate (meth) acrylate, 2-hydroxypropyl (meth)acrylate of diethanolamide monooleate and sorbitan monooleate glyceryl (meth)acrylate.

In accordance with a preferred embodiment, the monomer of formula (I) is as follows:

[Chem. 2]

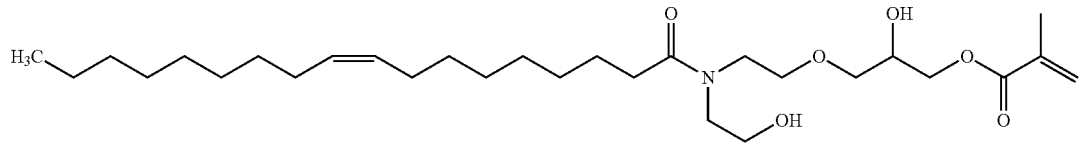

This preferred monomer corresponds to the formula $H_3C-(CH_2)_7-CH=CH-(CH_2)_7-C(=O)-N(CH_2CH_2OH)-(CH_2)_2-O-CH_2-CH(OH)-CH_2-O-C(=O)-C(CH_3)=CH_2$.

In a particular embodiment of the invention, the interface polymer according to the invention is obtained by polymerization of at least one monomer of formula (I).

In a particular embodiment, the interface polymer according to the invention is obtained by polymerization of at least one monomer of formula (I) and at least one non-ionic monomer and/or at least one anionic monomer and/or at least one cationic monomer.

The various monomers that are implemented may be chosen from among the respective lists mentioned above in the description of the (co)polymer E of the hydrophilic phase.

Advantageously, the interface polymer comprises between 0.0001 and 10%, more advantageously between 0.0001 and 5%, and even more advantageously between 0.0001 and 1% of the monomer of formula (I), by weight relative to the total weight of monomers.

In general, the time required to degrade the shell increases with the percentage of monomer of formula (I).

Where appropriate, the interface polymer comprises between 50 and 99.9999%, and more advantageously between 60 and 99.9999% of non-ionic monomer (different from the monomer of formula (I)) by weight relative to the total weight of monomers.

Where appropriate, the interface polymer comprises between 10 and 99.9999%, and more advantageously between 20 and 99.9999% of anionic monomer, by weight relative to the total weight of monomers.

Where appropriate, the interface polymer comprises between 1 and 99.9999%, and more advantageously between 10 and 99.9999% of cationic monomer, by weight relative to the total weight of monomers.

Advantageously, the interface polymer is neither cross-linked nor branched. It is advantageously linear.

The Shell

According to the invention, the interface polymer forms a shell around droplets forming the hydrophilic phase. In addition to the monomers mentioned above, the interface polymer may comprise at least one structural agent. The structural agent is advantageously chosen from diacrylamides or methacrylamides of diamines; acrylic esters of di-, tri- or tetrahydroxy compounds; methacrylic esters of di-, tri- or tetrahydroxy compounds; divinyl compounds preferably separated by an azo group; diallyl compounds preferably separated by an azo group; vinyl esters of di- or trifunctional acids; allyl esters of di- or trifunctional acids; methylenebisacrylamide; diallylamine; triallylamine; tetraallylammonium chloride; divinyl sulphone; polyethylene glycol dimethacrylate and diethylene glycol diallyl ether.

Permeability Modification Method

The injection fluid used in the method according to the invention has the functionality of blocking high-permeability and/or high water-content zones in order to reduce or eliminate the permeability of these zones.

Whatever the form used (a dispersion, a concentrated dispersion or a solid form obtained from the dispersion), the protective effect of the shell is produced and the linear (co)polymers E are thus protected from chemical and mechanical degradation, in particular during injection.

In other words, and more precisely, the method for modifying the water permeability of a subterranean formation according to the invention comprises the following steps:

Preparing an aqueous injection fluid by adding, to water or brine, the dispersion a hydrophilic phase in a lipophilic phase as described above, or its concentrated form after removal of part of the water, or its solid form obtained after drying of said dispersion, Injecting the injection fluid into a subterranean formation, Releasing said linear (co)polymer E by hydrolysis of the interface polymer, Modifying the water permeability of the subterranean formation by viscosification of said injection fluid.

The operations of modifying the water permeability of a reservoir differ from enhanced oil recovery techniques. The modification operations are characterized by volume-limited injections of polymer solution in order to create a localized phenomenon in the reservoir, namely, for conformance, blocking of the high-permeability zones and, for stopping water, blocking of zones where water enters the formation. Injections are generally carried out either via an injection well or via a production well over fairly short periods of a few days and generally less than one month, and with volumes representing less than 5% of the pore volume of the reservoir. The pore volume corresponds to the volume not occupied by rock in the reservoir, which allows a correlation with the permeable zone. A person skilled in the art will be able to adapt the minimum volume of injected fluid making it possible to modify the water permeability of a reservoir depending on the characteristics of said reservoir.

Conversely, polymer-based enhanced oil recovery techniques involve the continuous and prolonged injection of polymer solution to flush the reservoir from an injection well to a production well. The objective is not to treat a zone of the reservoir but the reservoir as a whole, in order to recover the maximum amount of oil. For this purpose, it is necessary to inject a much larger volume of aqueous solution generally representing at least 30% to 500%, or even more, of the pore volume. An oily and sometimes gaseous aqueous mixture is then recovered from the production wells.

As previously mentioned, the dispersion as described above makes it possible not only to protect the linear (co)polymers E from chemical and mechanical degradation during the steps of preparing and injecting the injection fluid, but also to delay the viscosification of the fluid. These properties are obtained by virtue of the shell formed by the interface polymer which, when degraded by hydrolysis, leads to the release of the linear (co)polymer E.

According to the invention, the injection fluid advantageously comprises between 30 ppm and 50,000 ppm (by weight) of the dispersion or concentrated dispersion or solid form obtained from the dispersion, more advantageously between 100 and 30,000 ppm, and even more advantageously between 300 and 15,000 ppm.

According to the invention, the injection fluid advantageously comprises between 200 ppm and 50,000 ppm (by weight) of (co)polymer E, more advantageously between 250 and 25,000 ppm, and even more advantageously between 500 and 20,000 ppm.

Once the injection fluid is injected, the (co)polymer is released following degradation of the shell formed by the interface polymer under the temperature and/or pH conditions of the subterranean formation.

Thus, the (co)polymer included in the hydrophilic phase is protected by the shell formed from at least one interface polymer obtained by polymerization of at least one monomer of formula (I), the shell being capable of being degraded under the temperature and/or pH conditions of the subterranean formation.

The method according to the invention makes it possible to protect the polymer from mechanical and chemical degradation (oxygen, metals, $H_2S$) linked to the preparation of the composition injected with the polymer, and to its injection, while maintaining good injectivity and a good ability to block the permeable zones of the subterranean formation. In addition, the shell makes it possible to delay the release of the (co)polymers.

Without wishing to be bound to any theory, the formation of the injection fluid by introducing the dispersion according to the invention does not make it possible to release the (co)polymer from its shell, even in the presence of a reverser (oil-in-water surfactant). The pH and/or temperature of the subterranean formation allows hydrolysis of the interface polymer and thus the delayed release of the (co)polymer.

According to a particular embodiment of the invention, in addition to the dispersion, the injection fluid may comprise up to 2000 ppm (by weight) of linear (co)polymer without a shell (NE). The linear (co)polymer NE may be identical to or different from the linear (co)polymer E of the dispersion.

The linear (co)polymer NE is obtained from monomers chosen from the respective lists mentioned above in the description of the linear (co)polymer E of the hydrophilic phase, in the same proportions.

According to another particular embodiment of the invention, the injection fluid comprising the linear (co)polymer E can be injected before, during or after an enhanced oil and/or gas recovery step.

This enhanced oil and/or gas recovery step may optionally be implemented with a fluid with a viscosity lower than that of the conformance fluid.

According to another particular embodiment of the invention, the injection fluid is injected into an injection well.

According to another particular embodiment of the invention, the injection fluid is injected into a production well.

The invention and the advantages resulting from it appear more clearly from the following figures and examples that are given to illustrate the invention and in non-limiting manner.

EXAMPLES OF EMBODIMENTS OF THE INVENTION

Example 1

Figure 1:
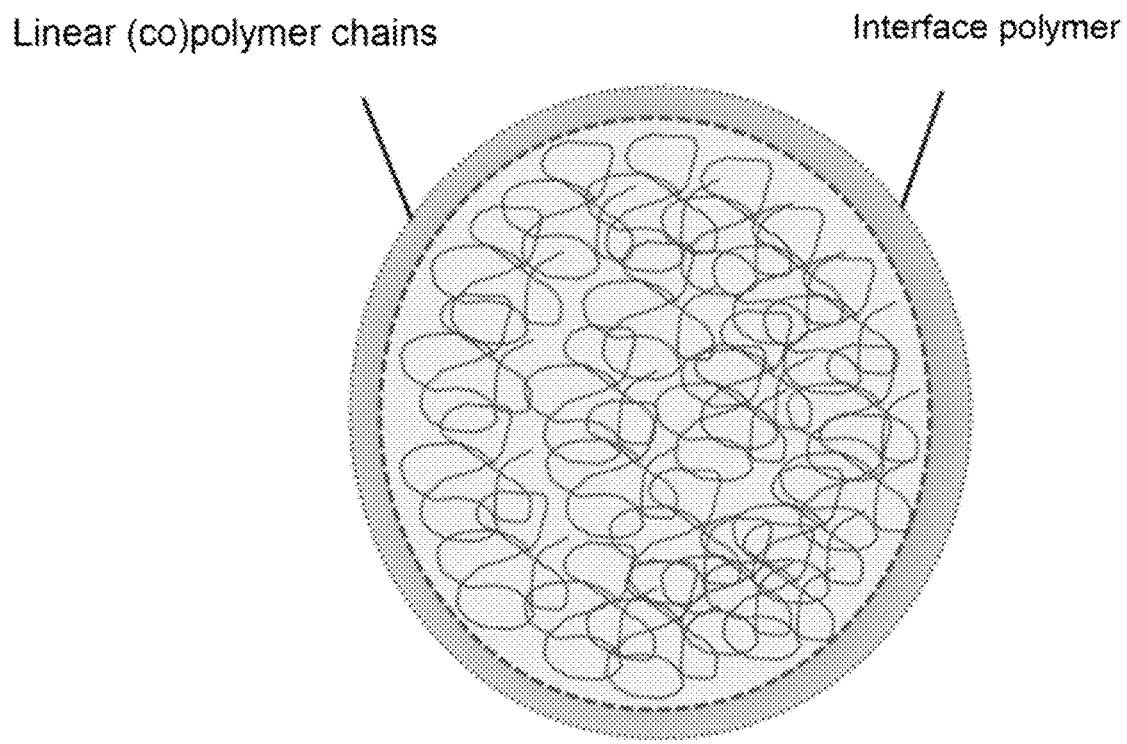
FIG. 1 is a schematic illustration of linear (co)polymers in a shell formed by an interface polymer.

Part A: Preparation of a Composition C1 Comprising a Monomer X1 Corresponding to Formula (I)

0.46 g of glycidyl methacrylate (97% by weight aqueous solution) is added dropwise to 20.0 g of oleyl diethanolamide (diethanolamide monooleate Witcamide 511-AkzoNobel) with magnetic stirring. The medium is stirred for 12 hours at ambient temperature.

Part B: Preparation of a Dispersion According to the Invention

A hydrophilic phase is prepared containing 365.8 g of acrylamide (50% by weight aqueous solution), 24.6 g of acrylic acid (100%), 234.6 g of sodium salt of 2-acrylamido-2-tert-butylsulphonic acid (50% by weight aqueous solution), 29.0 g of deionized water, 25.9 g of sodium hydroxide (50% by weight aqueous solution), 1.6 g of an aqueous solution of sodium hypophosphite (5 g/L), 0.94 g of tert-butyl hydroperoxide (0.7% by weight aqueous solution), 0.40 g of pentasodium salt of diethylenetriaminepentaacetic acid (Versenex 80) dispersed in a mixture of 280 g of aliphatic hydrocarbon D100S (Exxsol D100) and 20 g of composition C1 comprising a monomer X1. The pH is adjusted to 6.50.

After homogenization and deoxygenation with nitrogen for 30 minutes, polymerization is initiated by adding a sodium bisulphite solution.

Example 2

Part A: Preparation of a Composition C2 Comprising a Monomer X2 Corresponding to Formula (I)

15.7 g of glycidyl methacrylate (97% by weight aqueous solution) is added dropwise to 20.0 g of oleyl diethanolamide (diethanolamide monooleate Witcamide 511-AkzoNobel) with magnetic stirring. The medium is stirred for 12 hours at ambient temperature.

Part B: Preparation of a Dispersion without Interface Polymer (Counter-Example)

An aqueous phase containing 365.8 g of acrylamide (50% by weight aqueous solution), 24.6 g of acrylic acid (100%), 234.6 g of sodium salt of 2-acrylamido-2-tert-butylsulphonic acid (50% by weight aqueous solution), 29.0 g of deionized water, 25.9 g of sodium hydroxide (50% by weight aqueous solution), 1.6 g of an aqueous solution of sodium hypophosphite (5 g/L), 0.94 g of tert-butyl hydroperoxide (0.7% by weight aqueous solution), 0.40 g of pentasodium salt of diethylenetriaminepentaacetic acid (Versenex 80) dispersed in a mixture of 280 g of aliphatic hydrocarbon D100S (Exxsol D100) and 20 g of Witcamide 511. The pH is adjusted to 6.50.

After homogenization and deoxygenation with nitrogen for 30 minutes, polymerization is initiated by adding a sodium bisulphite solution.

Part C: Preparation of a Dispersion According to the Invention 36 g of acrylamide (50% by weight), 1.6 g of tert-butyl hydroperoxide (0.7% by weight) and 0.6 g of composition C2 comprising a monomer X2 are added to the dispersion obtained in part B. The formation of the interface polymer, by polymerization of the monomers of composition C2, is initiated by adding a sodium bisulphite solution (radical initiator).

Example 3—Resistance to Mechanical Degradation as a Function of the Polymer Concentration Aqueous solutions of linear polymer are produced by adding a dispersion, described in example 1, with a variable concentration of polymer, to synthetic seawater, and stirring vigorously.

TABLE 1

Viscosity (cp) of aqueous polymer solutions with polymer shell after degradation of the shell as a function of the polymer concentration measured at 10 s$^{-1}$ and T: 25° C.

| Polymer concentration of the aqueous solution (ppm) | Viscosity with shell | Viscosity after degradation of the shell |
|---|---|---|
| 80 | 1 | 2 |
| 1,000 | 1 | 8 |
| 3,500 | 2 | 82 |
| 10,000 | 10 | 681 |
| 32,400 | 60 | 7,270 |
| 100,000 | 300 | 80,000 |

In cases where the polymer concentration is high, the viscosity of the aqueous polymer solution with shell remains low and allows injection into the well and propagation to the target zone. After degradation of the shell, the viscosity can build and block the high-permeability zone.

Example 4—Release of the Linear (Co)Polymer

Figure 2:
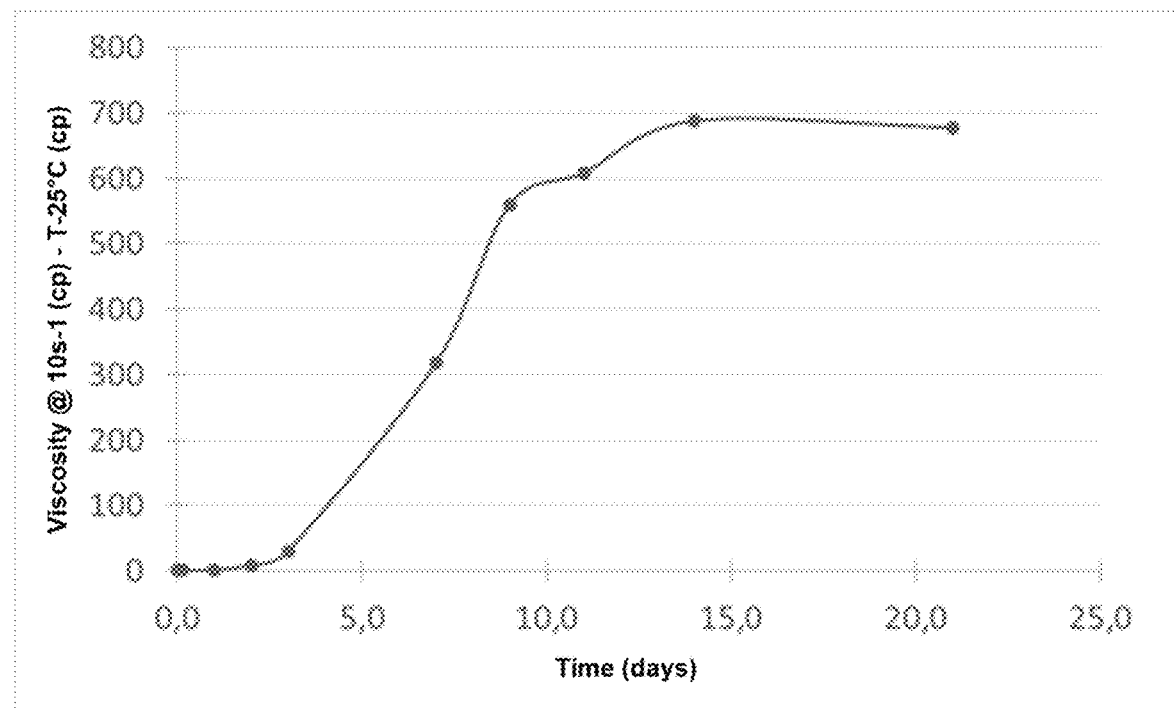
FIG. 2 illustrates the release of the linear (co)polymers from the dispersion of example 1, measured by the increase in viscosity.

Aqueous solutions containing 10,000 ppm of the polymer of example 1, with shell, were prepared in synthetic seawater. The solutions were placed in an oven at 60° C. and the viscosity of the samples was measured regularly. The results shown in FIG. 2 show a very high increase in viscosity, but this increase is delayed since the maximum viscosity is reached after 10 to 15 days.

Example 5—Resistance to Mechanical Degradation as a Function of the Shear Gradient In order to demonstrate the mechanical protection of the polymer provided by the shell, aqueous solutions containing 1000 ppm of the polymer of example 2, with shell (example 2, part C according to the invention) and without shell (counter-example—example 2, part B) were prepared in synthetic seawater. The solutions were sheared by passing them through a pipe with a small cross-section at different pressures. The shear gradient was determined by measuring the flow at the outlet of a 0.5 mm capillary. The samples were then collected at the outlet of the pipe and the viscosity was measured at 7.3 s$^{-1}$ and 25° C. on a Kinexus pro+ by Malvern Instruments.

Figure 3:
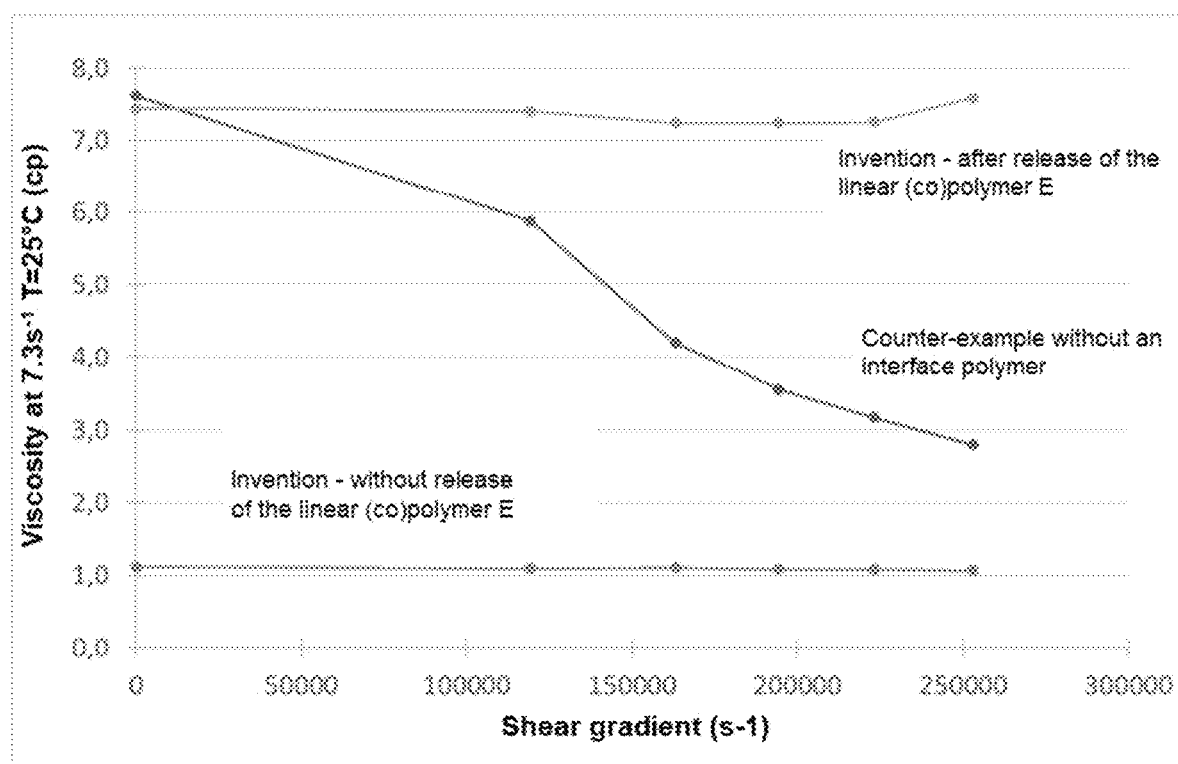
FIG. 3 illustrates the viscosity, as a function of shear gradient, of the dispersion of example 2 with the shell formed by the interface polymer, without a shell and after the release of the water-soluble (co)polymer.

The data is displayed in FIG. 3. The polymer with no shell is rapidly degraded. Polymer solutions that have a shell maintain constant viscosities very close to 1.0 cp (1 cp=1 cps=1 mPa·s). The solutions prepared according to the invention were collected after shearing, i.e., at each measurement point. After measuring their viscosity, they were then activated by being placed for 4 days in an oven at 58° C. Their viscosity after the release of the water-soluble polymer was then measured. The latter remains very close to the viscosity of the non-sheared solutions without an initial shell (counter-example).

TABLE 2

Viscosity of the polymer solution measured at 7.3 s$^{-1}$ and T = 25° C. as a function of the previously applied shear (FIG. 3).

| | Shear gradient (s$^{-1}$) | | | | | |
|---|---|---|---|---|---|---|
| | 0 | 119,000 | 163,000 | 195,000 | 223,000 | 253,000 |
| P1: Viscosity without shell | 7.6 | 5.9 | 4.2 | 3.5 | 3.2 | 2.8 |
| P2: Viscosity with shell | 1.1 | 1.1 | 1.1 | 1.1 | 1.1 | 1.1 |
| P3: Viscosity after degradation of the shell | 7.4 | 7.4 | 7.2 | 7.2 | 7.2 | 7.6 |

The invention claimed is:

1. A method for modifying the water permeability of a subterranean formation which comprises oil, comprising at least the following steps:
   preparing an injection fluid from a dispersion of a hydrophilic phase in a lipophilic phase, with water or brine, the dispersion comprising:
   a hydrophilic phase comprising at least one linear (co)polymer E,
   a lipophilic phase,
   at least one interface polymer composed of at least one monomer of formula (I):

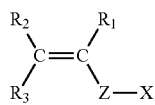

formula (I)

in which,
   R1, R2, R3 are independently selected from the group consisting of a hydrogen atom, a methyl group and Z—X,
   Z is selected from the group consisting of C(=O)—O; C(=O)—NH; O—C(=O); NH—C(=O)—NH; NH—C(=O)—O; and a saturated or unsaturated, substituted or unsubstituted carbon chain having from 1 to 20 carbon atoms which may have one or more heteroatoms selected from nitrogen and oxygen,
   X is a group chosen from the alkanolamides, sorbitan esters, ethoxylated sorbitan esters, glyceryl esters, and polyglycosides; and comprising a saturated or unsaturated, linear, branched or cyclic, optionally aromatic, hydrocarbon chain, and
injecting the injection fluid into the subterranean formation, the fluid comprising a concentration of linear (co)polymer E such that, when released and in contact with water, the viscosity of the injection fluid is greater than the viscosity of the oil present in the formation.

2. The method according to claim 1, wherein the linear (co)polymer E is obtained from at least one non-ionic monomer and/or at least one anionic monomer and/or at least one cationic monomer and/or at least one zwitterionic monomer.

3. The method according to claim 2, wherein the non-ionic monomer is selected from the group consisting of acrylamide, methacrylamide, N-isopropylacrylamide, N,N-dimethylacrylamide, N-methylolacrylamide, N-vinylformamide, N-vinylacetamide, N-vinylpyridine, N-vinylpyrrolidone, acryloyl morpholine, glycidyl methacrylate, glyceryl methacrylate and diacetone acrylamide.

4. The method according to claim 2, wherein the anionic monomer is chosen from the group consisting of salts of 3-sulphopropyl methacrylate, and unsalified, partially or totally salified monomers chosen from acrylic acid, methacrylic acid, itaconic acid, maleic acid, acrylamido tertiary butyl sulphonic acid, vinylsulphonic acid, and vinylphosphonic acid.

5. The method according to claim 1, wherein the interface polymer comprises, in addition to the monomer of formula (I), at least one non-ionic monomer and/or at least one anionic monomer and/or at least one cationic monomer.

6. The method according to claim 1, wherein the monomer of formula (I) has the following formula:

formula (I)

in which,
   R1, R2, R3, independently, are a hydrogen atom or a methyl group,
   Z is selected from the group consisting of CH$_2$, C(=O)—O, C(=O)—NH, and —(C=O)—O—CH$_2$—CH(OH)—CH$_2$, and
   X is a group chosen from the alkanolamides and the sorbitan esters, and comprising a saturated or unsaturated, linear, branched or cyclic, optionally aromatic, hydrocarbon chain.

7. The method according to claim 1, wherein the monomer of formula (I) is selected from sorbitan monooleate (meth)acrylate, 2-hydroxypropyl (meth)acrylate of diethanolamide monooleate or sorbitan monooleate glyceryl (meth)acrylate.

8. The method according to claim 1, wherein the monomer of formula (I) is the following:

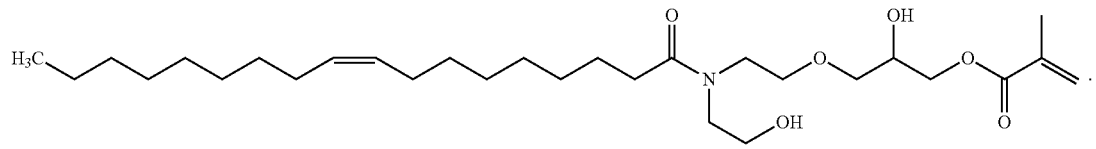 [SMILES: C=C(C)C(=O)OCC(O)COCCN(CCO)C(=O)CCCCCCC/C=C\CCCCCCCC]

9. The method according to claim 1, wherein the (co)polymer comprises at least one associative cationic monomer and/or at least one LCST group.

10. The method according to claim 3, wherein the anionic monomer is chosen from the group consisting of salts of 3-sulphopropyl methacrylate, and unsalified, partially or totally salified monomers chosen from acrylic acid, methacrylic acid, itaconic acid, maleic acid, acrylamido tertiary butyl sulphonic acid, vinylsulphonic acid, and vinylphosphonic acid.

11. The method according to claim 1, wherein the interface polymer comprises, in addition to the monomer of formula (I), at least one non-ionic monomer and/or at least one anionic monomer and/or at least one cationic monomer, and wherein:
the linear (co)polymer E is obtained from at least one non-ionic monomer and/or at least one anionic monomer and/or at least one cationic monomer and/or at least one zwitterionic monomer; and/or
the non-ionic monomer is selected from the group consisting of acrylamide, methacrylamide, N-isopropylacrylamide, N,N-dimethylacrylamide, N-methylolacrylamide, N-vinylformamide, N-vinylacetamide, N-vinylpyridine, N-vinylpyrrolidone, acryloyl morpholine, glycidyl methacrylate, glyceryl methacrylate and diacetone acrylamide; and/or
the anionic monomer is chosen from the group consisting of salts of 3-sulphopropyl methacrylate, and unsalified, partially or totally salified monomers chosen from acrylic acid, methacrylic acid, itaconic acid, maleic acid, acrylamido tertiary butyl sulphonic acid, vinylsulphonic acid, and vinylphosphonic acid.

12. The method according to claim 11, wherein:
the linear (co)polymer E is obtained from at least one non-ionic monomer and/or at least one anionic monomer and/or at least one cationic monomer and/or at least one zwitterionic monomer; and
the non-ionic monomer is selected from the group consisting of acrylamide, methacrylamide, N-isopropylacrylamide, N,N-dimethylacrylamide, N-methylolacrylamide, N-vinylformamide, N-vinylacetamide, N-vinylpyridine, N-vinylpyrrolidone, acryloyl morpholine, glycidyl methacrylate, glyceryl methacrylate and diacetone acrylamide; and
the anionic monomer is chosen from the group consisting of salts of 3-sulphopropyl methacrylate, and unsalified, partially or totally salified monomers chosen from acrylic acid, methacrylic acid, itaconic acid, maleic acid, acrylamido tertiary butyl sulphonic acid, vinylsulphonic acid, and vinylphosphonic acid.

13. The method according to claim 1, wherein the monomer of formula (I) has the following formula:

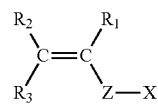

formula (I)

in which,
R1, R2, R3, independently, are a hydrogen atom or a methyl group,
Z is selected from the group consisting of $CH_2$, $C(=O)-O$, $C(=O)-NH$, and $-(C=O)-O-CH_2-CH(OH)-CH_2$, and
X is a group chosen from the alkanolamides and the sorbitan esters, and comprising a saturated or unsaturated, linear, branched or cyclic, optionally aromatic, hydrocarbon chain,
and wherein:
the linear (co)polymer E is obtained from at least one non-ionic monomer and/or at least one anionic monomer and/or at least one cationic monomer and/or at least one zwitterionic monomer; and/or
the non-ionic monomer is selected from the group consisting of acrylamide, methacrylamide, N-isopropylacrylamide, N,N-dimethylacrylamide, N-methylolacrylamide, N-vinylformamide, N-vinylacetamide, N-vinylpyridine, N-vinylpyrrolidone, acryloyl morpholine, glycidyl methacrylate, glyceryl methacrylate and diacetone acrylamide; and/or
the anionic monomer is chosen from the group consisting of salts of 3-sulphopropyl methacrylate, and unsalified, partially or totally salified monomers chosen from acrylic acid, methacrylic acid, itaconic acid, maleic acid, acrylamido tertiary butyl sulphonic acid, vinylsulphonic acid, and vinylphosphonic acid.

14. The method according to claim 13, wherein:
the linear (co)polymer E is obtained from at least one non-ionic monomer and/or at least one anionic monomer and/or at least one cationic monomer and/or at least one zwitterionic monomer; and
the non-ionic monomer is selected from the group consisting of acrylamide, methacrylamide, N-isopropylacrylamide, N,N-dimethylacrylamide, N-methylolacrylamide, N-vinylformamide, N-vinylacetamide, N-vinylpyridine, N-vinylpyrrolidone, acryloyl morpholine, glycidyl methacrylate, glyceryl methacrylate and diacetone acrylamide; and
the anionic monomer is chosen from the group consisting of salts of 3-sulphopropyl methacrylate, and unsalified, partially or totally salified monomers chosen from acrylic acid, methacrylic acid, itaconic acid, maleic acid, acrylamido tertiary butyl sulphonic acid, vinylsulphonic acid, and vinylphosphonic acid.

15. The method according to claim 1, wherein the monomer of formula (I) is selected from sorbitan monooleate (meth)acrylate, 2-hydroxypropyl (meth)acrylate of diethanolamide monooleate or sorbitan monooleate glyceryl (meth)acrylate, and wherein:
the linear (co)polymer E is obtained from at least one non-ionic monomer and/or at least one anionic monomer and/or at least one cationic monomer and/or at least one zwitterionic monomer; and/or
the non-ionic monomer is selected from the group consisting of acrylamide, methacrylamide, N-isopropylacrylamide, N,N-dimethylacrylamide, N-methylolacrylamide, N-vinylformamide, N-vinylacetamide, N-vinylpyridine, N-vinylpyrrolidone, acryloyl morpholine, glycidyl methacrylate, glyceryl methacrylate and diacetone acrylamide; and/or
the anionic monomer is chosen from the group consisting of salts of 3-sulphopropyl methacrylate, and unsalified, partially or totally salified monomers chosen from acrylic acid, methacrylic acid, itaconic acid, maleic acid, acrylamido tertiary butyl sulphonic acid, vinylsulphonic acid, and vinylphosphonic acid.

16. The method according to claim 15, wherein:
the linear (co)polymer E is obtained from at least one non-ionic monomer and/or at least one anionic monomer and/or at least one cationic monomer and/or at least one zwitterionic monomer; and
the non-ionic monomer is selected from the group consisting of acrylamide, methacrylamide, N-isopropylacrylamide, N,N-dimethylacrylamide, N-methylolacrylamide, N-vinylformamide, N-vinylacetamide, N-vinylpyridine, N-vinylpyrrolidone, acryloyl morpholine, glycidyl methacrylate, glyceryl methacrylate and diacetone acrylamide; and
the anionic monomer is chosen from the group consisting of salts of 3-sulphopropyl methacrylate, and unsalified, partially or totally salified monomers chosen from acrylic acid, methacrylic acid, itaconic acid, maleic acid, acrylamido tertiary butyl sulphonic acid, vinylsulphonic acid, and vinylphosphonic acid.

17. The method according to claim 1, wherein the monomer of formula (I) is the following:

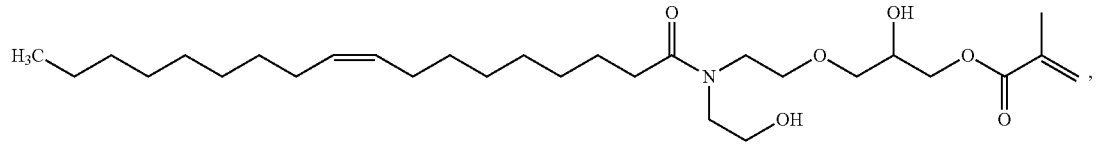 [SMILES: C=C(C)C(=O)OCC(O)COCCN(CCO)C(=O)CCCCCCC/C=C\CCCCCCCC]

and wherein:
the linear (co)polymer E is obtained from at least one non-ionic monomer and/or at least one anionic monomer and/or at least one cationic monomer and/or at least one zwitterionic monomer; and/or
the non-ionic monomer is selected from the group consisting of acrylamide, methacrylamide, N-isopropylacrylamide, N,N-dimethylacrylamide, N-methylolacrylamide, N-vinylformamide, N-vinylacetamide, N-vinylpyridine, N-vinylpyrrolidone, acryloyl morpholine, glycidyl methacrylate, glyceryl methacrylate and diacetone acrylamide; and/or
the anionic monomer is chosen from the group consisting of salts of 3-sulphopropyl methacrylate, and unsalified, partially or totally salified monomers chosen from acrylic acid, methacrylic acid, itaconic acid, maleic acid, acrylamido tertiary butyl sulphonic acid, vinylsulphonic acid, and vinylphosphonic acid.

18. The method according to claim 17, wherein:
the linear (co)polymer E is obtained from at least one non-ionic monomer and/or at least one anionic monomer and/or at least one cationic monomer and/or at least one zwitterionic monomer; and
the non-ionic monomer is selected from the group consisting of acrylamide, methacrylamide, N-isopropylacrylamide, N,N-dimethylacrylamide, N-methylolacrylamide, N-vinylformamide, N-vinylacetamide, N-vinylpyridine, N-vinylpyrrolidone, acryloyl morpholine, glycidyl methacrylate, glyceryl methacrylate and diacetone acrylamide; and
the anionic monomer is chosen from the group consisting of salts of 3-sulphopropyl methacrylate, and unsalified, partially or totally salified monomers chosen from acrylic acid, methacrylic acid, itaconic acid, maleic acid, acrylamido tertiary butyl sulphonic acid, vinylsulphonic acid, and vinylphosphonic acid.

19. The method according to claim 1, wherein the (co)polymer comprises at least one associative cationic monomer and/or at least one LCST group, and wherein:
the linear (co)polymer E is obtained from at least one non-ionic monomer and/or at least one anionic monomer and/or at least one cationic monomer and/or at least one zwitterionic monomer; and/or
the non-ionic monomer is selected from the group consisting of acrylamide, methacrylamide, N-isopropylacrylamide, N,N-dimethylacrylamide, N-methylolacrylamide, N-vinylformamide, N-vinylacetamide, N-vinylpyridine, N-vinylpyrrolidone, acryloyl morpholine, glycidyl methacrylate, glyceryl methacrylate and diacetone acrylamide; and/or
the anionic monomer is chosen from the group consisting of salts of 3-sulphopropyl methacrylate, and unsalified, partially or totally salified monomers chosen from acrylic acid, methacrylic acid, itaconic acid, maleic acid, acrylamido tertiary butyl sulphonic acid, vinylsulphonic acid, and vinylphosphonic acid.

20. The method according to claim 19, wherein:
the linear (co)polymer E is obtained from at least one non-ionic monomer and/or at least one anionic monomer and/or at least one cationic monomer and/or at least one zwitterionic monomer; and
the non-ionic monomer is selected from the group consisting of acrylamide, methacrylamide, N-isopropylacrylamide, N,N-dimethylacrylamide, N-methylolacrylamide, N-vinylformamide, N-vinylacetamide, N-vinylpyridine, N-vinylpyrrolidone, acryloyl morpholine, glycidyl methacrylate, glyceryl methacrylate and diacetone acrylamide; and
the anionic monomer is chosen from the group consisting of salts of 3-sulphopropyl methacrylate, and unsalified, partially or totally salified monomers chosen from acrylic acid, methacrylic acid, itaconic acid, maleic acid, acrylamido tertiary butyl sulphonic acid, vinylsulphonic acid, and vinylphosphonic acid.

* * * * *